United States Patent [19]

Zhao

[11] Patent Number: 4,974,303

[45] Date of Patent: Dec. 4, 1990

[54] ANTICORROSIVE PRODUCT LINED WITH POLYTETRAFLUOROTHYLENE AND THE METHOD FOR MAKING THE SAME

[76] Inventor: Yonggao Zhao, 14 Nong 66, Sanpai Fang, Wenzhou, Zhejiang Province, China

[21] Appl. No.: 362,648

[22] Filed: Jun. 7, 1989

[30] Foreign Application Priority Data

Jun. 8, 1988 [CN] China .................... 88103518.1

[51] Int. Cl.$^5$ .................... B23K 20/22; B22B 15/14
[52] U.S. Cl. .................... 29/17.2; 29/419.1; 29/469.5
[58] Field of Search .................... 29/17 R, 419.1, 17.2, 29/17.1, 469.5

[56] References Cited

U.S. PATENT DOCUMENTS 4,697,324 10/1987 Grant et al. .................... 29/419.1
4,782,992 11/1988 Doble .................... 29/419.1 X

*Primary Examiner*—Timothy V. Eley
*Attorney, Agent, or Firm*—David H. Semmes

[57] ABSTRACT

The invention relates to polytetraflyororthylene (PTFE) anticorrosive product and the method for making the same. The product is characterized in that a metal sieve is sandwiched in PTFE layer. The disadvantage of single PTFE product namely damage of the product caused by the change of temperature and the deformation of the product caused by the cold flow property are overcome, so as to guarantee the quality of the product, and increase the service life. The method for making the PTFE anticorrosive produce is an improvement to the prior method and further comprises the step of wrapping a layer of metal sieve between two steps of winding the PTFE tape.

5 Claims, 1 Drawing Sheet

ANTICORROSIVE PRODUCT LINED WITH POLYTETRAFLUOROTHYLENE AND THE METHOD FOR MAKING THE SAME

FIELD OF THE INVENTION

This invention relates to anticorrosive product lined with the polytetrafluorothylene and the method for making the same.

DESCRIPTION OF THE PRIOR ART

PTFE having the optimum chemical stability is one of the new materials in the world nowadays, and is the ideal material for manufacturing anticorrosive equipments for the use of the chemical industry. It is capable of withstanding temperature from $-195°-250°$ C. and has a high corrosion resistance. However, PTFE is a thermoplastic and an expensive material, so that it is unsuitable for being used as a structural material independently. Therefore, it is usually used as the linings in iron and steel components while PTFE being manufactured into thin layers. It has prominent feature of anticorrosive property against acid, alkali, salt, strong oxidizer, organic solvent and other highly corrosive mediums except the molten alkali metal, element of fluorine, and chlorine trifluoride. Their properties are superior than all of the other products of nonmetal materials and even better than stainless steel, anticorrosive alloys, titanium or zirconium itself and its alloys. The products lined with PTFE have applied to the chemical industry, petroleum and metallurgy fields etc.

PTFE is an inert material, it lacks fluidity, and has narrow temperature range for heat processing. It is difficult to produce various PTFE products with complex structure (such as the lining of large scale equipments: pipes and pipe fittings, columns, cadrons and vessels, as well as the other unit operation equipments and nonstandard products). Now only a few countries can manufacture products lined with PTFE, which is single PTFE only. It is hard to guarantee the quality of the PTFE lining especially at the connecting portions between the branch pipes and the main body of the equipments whatever it is welded, wrapped or formed by other techniques. Moreover, it has the fatal weakness of high thermal expansion coefficient (10 times as large as that of steel) and it has inherent cold flow property (the creep). The products with individual PTFE linings are easy to be damaged in use because the great expansion difference between the lining and the outer iron steel casing, thus their service life will be shortened and the life expectancy can't be determined to cause the difficult in design and in use, and to limit this kind of optimum new material to be widely used in the field of anticorrosion.

In order to overcome the difficulty in processing and improve the properties of the products, experiments on reinforcement of PTFE products by metal wires (in the form of spring) to improve the stability have been made by the inventor, but they fail to resolve the problems of high thermal-expansion, the inherent cold flow property, and the difficulty in processing those products with complex structures.

SUMMARY OF THE PRESENT INVENTION

The object of this invention is to provide an improved PTFE product, which can overcome the fatal weakness of PTFE products as mentioned above, can be easily made and has stable properties, and also to provide a method for making the same.

The object of this invention is achieved by sandwiching a metal mesh between PTFE layers to form an anticorrosive product. The thermal expansion and the inherent cold flow property of independent PTFE products are restrained by the mesh, so that it can prevent the products from damaging as a result of different coefficients of thermal expansion between the lining and the iron or steel structure, and improve the quality of the product. The method for making the anticorrosive product lined with PTFE described in the present invention is an improvement to the prior art, which comprising mouldpressing PTFE resin to form a bar blank, lathing the said PTFE bar blank to form a thin tape, winding the said PTFE tape around a core mould, heating and sintering the wound tape to form a resin agglomerate, removing the core mould out of the resin agglomerate, bending the edges of the resin agglomerate, and encasing the resin agglomerate into the steel structure components on the like. The method for processing the product lined with PTFE provided by the present invention is characterized in comprising the step of wrapping metal mesh between two wound tape layers, i.e. after the first step of winding several layers of PTFE tape (the numbers of layers depend on the thickness of the products), a metal mesh is placed on and then several layers of PTFE tape are wound again so as to sandwich the metal mesh in the layers of PTFE tape.

The technical contents of the present invention will be further described in detail in combination with the embodiment and drawings.

DESCRIPTION OF PREFERRED EMBODIMENT

Figure 1:
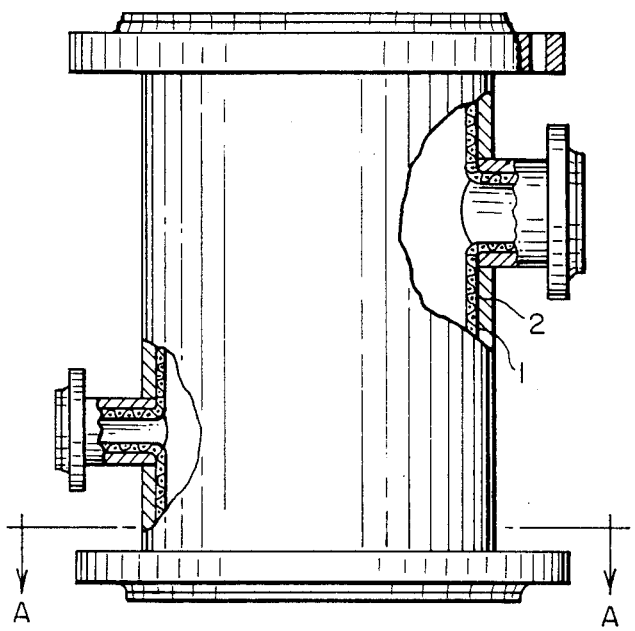
FIG. 1 is an elevation view showing an embodiment of column section with lining of PTFE reinforced by metal sieve.
Figure 2:
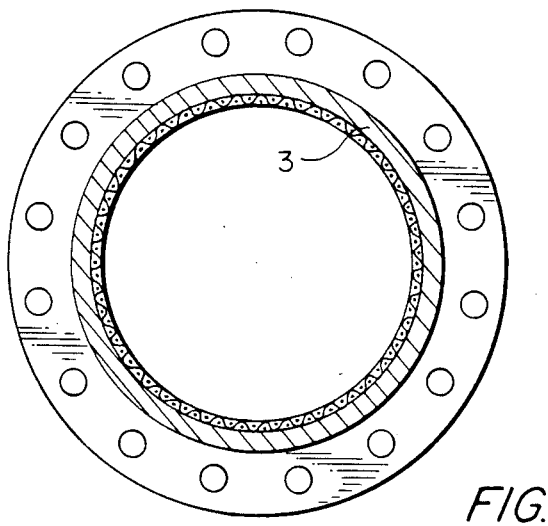
FIG. 2 is a sectional view of the embodiment along line A—A in FIG. 1.
Figure 3:
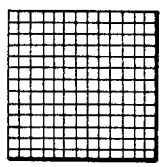
FIG. 3 is a schematic view showing the structure of the metal sieve.

The embodiment to be described is an anticorrosive column section. In FIGS. 1 and 2, an embodiment of anticorrosive column section with lining of PTFE reinforced by metal sieve has been shown. The partly sectional portion in FIG. 1 shows clearly the structure, which consists of PTFE layer (1) and metal sieve (2) sandwiched in the PTFE layer. In the embodiment, the product with PTFE reinforced by metal sieve forms the lining of the steel housing (3) of the column section. FIG. 3 shows the structure of metal sieve, which may be a 10–40 mesh steel (or iron) wire sieve made of wires 0.1–0.5 mm in diameter (the diameter of wire and the size of mesh depend on the size of the concrete product).

The method of the present invention comprises the following steps: mould-pressing PTFE resin powder to form a bar blank, lathing the PTFE bar blank to form PTFE tape, winding the PTFE tape around a core, wrapping the wound tape in a metal sieve further winding PTFE tape around the metal sieve, winding and binding tightly non-alkali fibre glass tape around the PTFE tape layer, sintering the wound body to form a resin agglomerate, removing the core from the agglomerate, bending the edges of the agglomerate, and encasing the resin agglomerate into the steel structure or the like.

The above steps for making the product of the present invention will be described in detail as follows:

The preparation of the PTFE bar blank:

The loose PTFE resin powder sieved through 20 mesh sieve is evenly poured into a steel mould and scraped down by a scraper. Then the top mould is put on the powder. The PTFE resin powder in the mould is pressed under a pressure of 200–300 Kgf/cm$^2$. After the mould is disassembled, the pressed bar blank formed is then sintered in an electric oven to form an agglomerate. The bar blank is sintered under the condition of a homogneous temperature in the oven and a slow rate of temperature variation so as to prevent the cracking of the product. A typical temperature-time scheme for sintering PTFE bar blank of 100–150 mm in diamiter and 100–150 mm in height is as follows:

The steps of temperature increasing:

| from room temperature to 327° C. | 30°–40° C./hr. |
| 327° C. | maintaining for 1 hr |
| from 327° to 380° C. | 20°–30° C./hr |
| 380° | maintaining for 2–4 hr |
| (until the whole bar appearance is semitransparent) | |

The steps of temperature decreasing:

| from 380° C. to 327° C. | 40°–50° C./hr |
| 327° C. | maintaining for 1 hr |
| from 327° C. to room temperature | 30°–40° C./hr |

Lathing the resin agglomerate to form PTFE thin tape:

The PTFE agglomerate is lathed by a common lathe to form thin PTFE tape of about 0.1–0.15 mm in thickness and 20–50 mm in width (the dimensions depend on the size of the product).

First step of winding PTFE tape:

The lathed PTFE tape is wound around a stainless steel core mould, which has size and figure corresponding to those of the product, up to about 50% of the total thickness of the product. The winding starts from one end to the other end of the mould, and then turns back to ensure cross with the precedent tape layer until the desired thickness is reached. The overlapping width of each adjacent tape wrapping is about 50%.

Wrapping with the metal sieve:

The wound PTFE tape layers are wrapped up tightly in a steel (or iron) wire sieve.

Further winding PTFE tape:

The lathed PTFE tape is wound further, in like manner of the first step of winding, around the metal sieve layer until the desired thickness is reached.

Winding non-alkali fiber glass tape:

Several layers of non-alkali fiber glass tape (about 0.1–0.15 mm in thickness and 25–50 mm in width) are wound around the layers of PTFE tape, and an iron wire is used to bind the fiber glass tape at the end.

Sintering the wound body to form resin agglomerate:

The wound body is sintered in an electrical oven to form resin agglomerate and multilayers of resin tape are agglomerated under certain temperature and pressure. Since the molten PTFE flows through the mesh from both sides and sintered together, the metal sieve is retained in the sandwiched and aglomerated body. The oven is preferably provided with far-infrared heating elements, the workpiece being arranged apart from the heat source more than 10 mm, means for turning the workpiece slowly, and means for circulating the hot air in the oven to heat the workpiece homogeneously. The sintering temperature is in the range of 380° C.±5° C. After reaching 380° C., this temperature should be maintained for 1–2 hr (depending on the dimensions of the workpiece) and the agglomerate formed is then cooled naturally in the oven.

Removing the core from the agglomerate:

The workpiece (with the core) is taken from the oven and cooled in the water, and after the fiber glass tape is removed, it is then placed on a core removing machine to remove the core.

Bending the edges of the agglomerat:

After the core is removed, edges of both ends of the agglomerate should be bent, and connected by flanges. Then the PTFE product to be used for lining of steel structure or the like is put in the pressure test with pressurized water. Different sets of moulds are required for different products to bend the edges of the agglomerate. The mould is preferably made of stainless steel. The portion to be bent should be heated, in combined salt bath of 45% NaNO$_3$ and 55% KNO$_3$, the temperature is kept at about 400° C., the end of the workpiece is then inserted into the salt bath for 1–2 Sec. until the appearance of the workpiece is semitransparent. Then, the workpiece is lifted promptly and inserted into a mouth-enlarged mould, and then drawn out again and put into a right angle setting mould to enable the bent edge perpendicular to the main body, meanwhile, the bent edge is pressed by a semiannular ballast, which may be moved reciprocally until said right-angled edge is set up.

The product should be undergone the examination including the visual examination (or visual inspection), in which the requirement is that the inside wall of the product should be of neat, smooth and pure white surface without white transverse streak, pressure test, which is processed under the action of pressurized water for 5 min with the requirement of without deformation, leakage or perspiration etc., and high-frequency spark examination with the requirement of without microbore, crack and other deficiencies, especially at the connection portion between the branch pipe and the main body for PTFE products with complex structure.

Encasing the PTFE product into the steel structure:

Except for direct use at low pressure owing to the reinforcement of the metal sieve, the PTFE products of the present invention is usually used as anticorrosive linings of the steel structure or the like. The PTFE products of the present invention may be encased into the steel structure by loose-fit, i.e. the edge of one end of the product is bent straight, and it leads the product into the steel structure and is then bent back to the original angle to engage with the seal surface of the flange. The encased product is undergone a pressure test under 1.5 times of the working pressure. The outside surface of the product is then painted with anticorrosive paint, the bent edge to be connected with flange is protected with an end plate. The product is therefore ready for use. FIG. 1 has shown an example of the product of the present invention.

Although particular embodiment of the invention has been described and illustraged herein, it is recognized that modifications and variations may readily occur to those skilled in the art and consequently, it is intended that the claims be interpreted to cover such modifications and equivalents.

From the ddescription mentioned above, it can be seen clearly that the advantages and the positive effects of the product of the present invention are as follows:

1. The crack resulted from the shrinkage caused by the temperature decrease (especially at the connection portion of the branch pipe and the main body) is effectively prevented by the metal sieve sandwiched in the PTFE layer, so as to guarantee the quality of the product and decrease the cost; 2. The damage of the product caused by the change of the temperature and the deformation of the product caused by the cold flow are avoided (especially when the product is used for the lining of the structure) because of the essentially stable dimensions of the product resulted from the metal sieve fixing the PTFE layer, so as to increase and guarantee the service life. 3. The reinforcement by the metal sieve enables the decrease of the thickness of PTFE products, thus the cost is reduced relatively. Under the moderate pressure conditions, the product can be independently used without steel casing. 4. As the products of this invention are of high quality and stable property, the loss by leakage and dribbing of the chemical medium may be greatly reduced and the environmental pollution can be improved.

What is claimed is:

1. A method for making polytetraflurothylene (PTFE) anticorrosive product, comprising the following steps:
    (a) mould-pressing PTFE powder to form a bar blank;
    (b) lathing the PTFE bar blank to form PTFE tape;
    (c) winding the PTFE tape around a core, which is made of stainless steel and has correspondent dimensions and figure of the product, until about 50% thickness of the product consists of wound PTFE tape;
    (d) wrapping a layer of metal sieve around the PTFE tape;
    (e) further winding the PTFE tape around the metal sieve layer until a desired thickness of the product is obtained;
    (f) winding and binding non-alkali fiber glass tape outside the exterior PTFE tape;
    (g) sintering the wound workpiece;
    (h) removing the core;
    (i) bending both end edges of the resulting agglomerated product; and
    (j) encasing the product within a steel structure to form the lining of the structure.

2. Method according to to claim 1, wherein in the step of wrapping metal sieve, a layer of about 10-40 Mesh metal sieve made of steel wire or iron wire of about 0.1-0.5 mm in diameter is used.

3. Method according to claim 2, wherein in the step of lathing the PTFE bar blank, the bar blank is lathed to form a thin tape having 0.1-0.15 mm in thickness and 20-50 mm in width.

4. A polytetrafluorothylene (PTFE) anticorrosive product manufactured according to the method of claim 1, wherein the product comprises a metal mesh sandwiched between PTFE layers (1).

5. A polytetrafluorothylene (PTFE) anticorrosive product according to claim 4, wherein the metal mesh is a 10-40 Mesh steel sieve or iron sieve made of steel wires or iron wires of 0.1-0.5 mm in diameter.

* * * * *